(12) United States Patent
Croswell et al.

(10) Patent No.: US 11,723,057 B1
(45) Date of Patent: *Aug. 8, 2023

(54) DEVICE, SYSTEM AND METHOD FOR RADIO-FREQUENCY EMISSIONS CONTROL

(71) Applicant: MOTOROLA SOLUTIONS, INC., Chicago, IL (US)

(72) Inventors: Robert T. Croswell, Elgin, IL (US); Bruce D. Mueller, Palatine, IL (US); Rodger W. Caruthers, Des Plaines, IL (US); Duane S. Andres, Schaumburg, IL (US); Randall Brace, Prospect Heights, IL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/673,092

(22) Filed: Feb. 16, 2022

Related U.S. Application Data

(63) Continuation of application No. 16/724,628, filed on Dec. 23, 2019, now Pat. No. 11,291,014.

(51) Int. Cl.
*H04B 7/00* (2006.01)
*H04W 72/04* (2023.01)
(Continued)

(52) U.S. Cl.
CPC ....... *H04W 72/541* (2023.01); *H04W 52/243* (2013.01); *H04W 72/1215* (2013.01)

(58) Field of Classification Search
None
See application file for complete search history.

(56) References Cited

U.S. PATENT DOCUMENTS

| 6,014,412 A | 1/2000 | Wiese et al. |
| 8,379,755 B2 * | 2/2013 | Cleveland ......... H04L 25/03834 375/232 |

(Continued)

FOREIGN PATENT DOCUMENTS

| ES | 2439867 T3 | 1/2014 |
| KR | 20200090081 A | 7/2020 |

OTHER PUBLICATIONS

Croswell, Robert T., et al., "Device, System and Method for Radio-Frequency Emissions Control", Non-Final Rejection, dated Apr. 29, 2021, issued in the U.S. Appl. No. 16/724,628, filed Dec. 23, 2019.

(Continued)

*Primary Examiner* — Sai Aung
(74) *Attorney, Agent, or Firm* — Perry + Currier, Inc.

(57) ABSTRACT

A device, system and method for radio-frequency emissions control is provided. The device comprises: a communication unit configured to communicate via main radio channels and a control channel, the main radio channels contributing to radio-frequency (RF) emissions; and a controller interconnected with the communication unit. The controller is configured to: receive, via the communication unit communicating over the control channel, an RF emissions control command to reduce the RF emissions emitted by the communication unit; and in response to receiving the RF emissions control command, control one or more of the communication unit and activity on the main radio channels to reduce the RF emissions.

18 Claims, 7 Drawing Sheets

(51) Int. Cl.
  *H01Q 25/00* (2006.01)
  *H04W 72/541* (2023.01)
  *H04W 52/24* (2009.01)
  *H04W 72/12* (2023.01)

(56) References Cited

U.S. PATENT DOCUMENTS

| | | | | |
|---|---|---|---|---|
| 10,462,754 | B1* | 10/2019 | Singh | H04W 52/367 |
| 10,681,651 | B1* | 6/2020 | Govindswamy | H04W 52/283 |
| 2010/0029289 | A1* | 2/2010 | Love | H04W 74/006 |
| | | | | 455/450 |
| 2012/0075989 | A1* | 3/2012 | Roessel | H04W 72/082 |
| | | | | 370/230 |
| 2014/0044023 | A1 | 2/2014 | Kazmi et al. | |
| 2014/0274189 | A1* | 9/2014 | Moller | H04W 52/04 |
| | | | | 455/522 |
| 2015/0071203 | A1* | 3/2015 | Lee | H04L 5/0066 |
| | | | | 370/329 |
| 2015/0318886 | A1* | 11/2015 | Hsu | H04M 1/6066 |
| | | | | 455/557 |
| 2017/0303136 | A1 | 10/2017 | Park et al. | |
| 2018/0083819 | A1* | 3/2018 | Rubin | H04L 27/2623 |
| 2019/0069302 | A1* | 2/2019 | Kumar | H04L 5/0057 |
| 2020/0196249 | A1* | 6/2020 | Du | H04M 1/72454 |
| 2020/0236618 | A1* | 7/2020 | Yu | G06N 3/08 |
| 2022/0279463 | A1* | 9/2022 | Schanko | H04W 52/367 |

OTHER PUBLICATIONS

Croswell, Robert T., et al., "Device, System and Method for Radio-Frequency Emissions Control", Final Rejection, dated Oct. 15, 2021, issued in the U.S. Appl. No. 16/724,628, filed Dec. 23, 2019.

* cited by examiner

DEVICE, SYSTEM AND METHOD FOR RADIO-FREQUENCY EMISSIONS CONTROL

BACKGROUND OF THE INVENTION

In mission critical situations, public-safety personnel, and the like, may communicate via radio-enabled devices that emit and/or radiate radio-frequency (RF) emissions. The RF emissions may be detected and used by a bad actor to detect the public-safety personnel. Further, a bad-actor may scramble radio channels over which the radio-enabled devices are communicating once they detect the frequencies of the radio channels.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
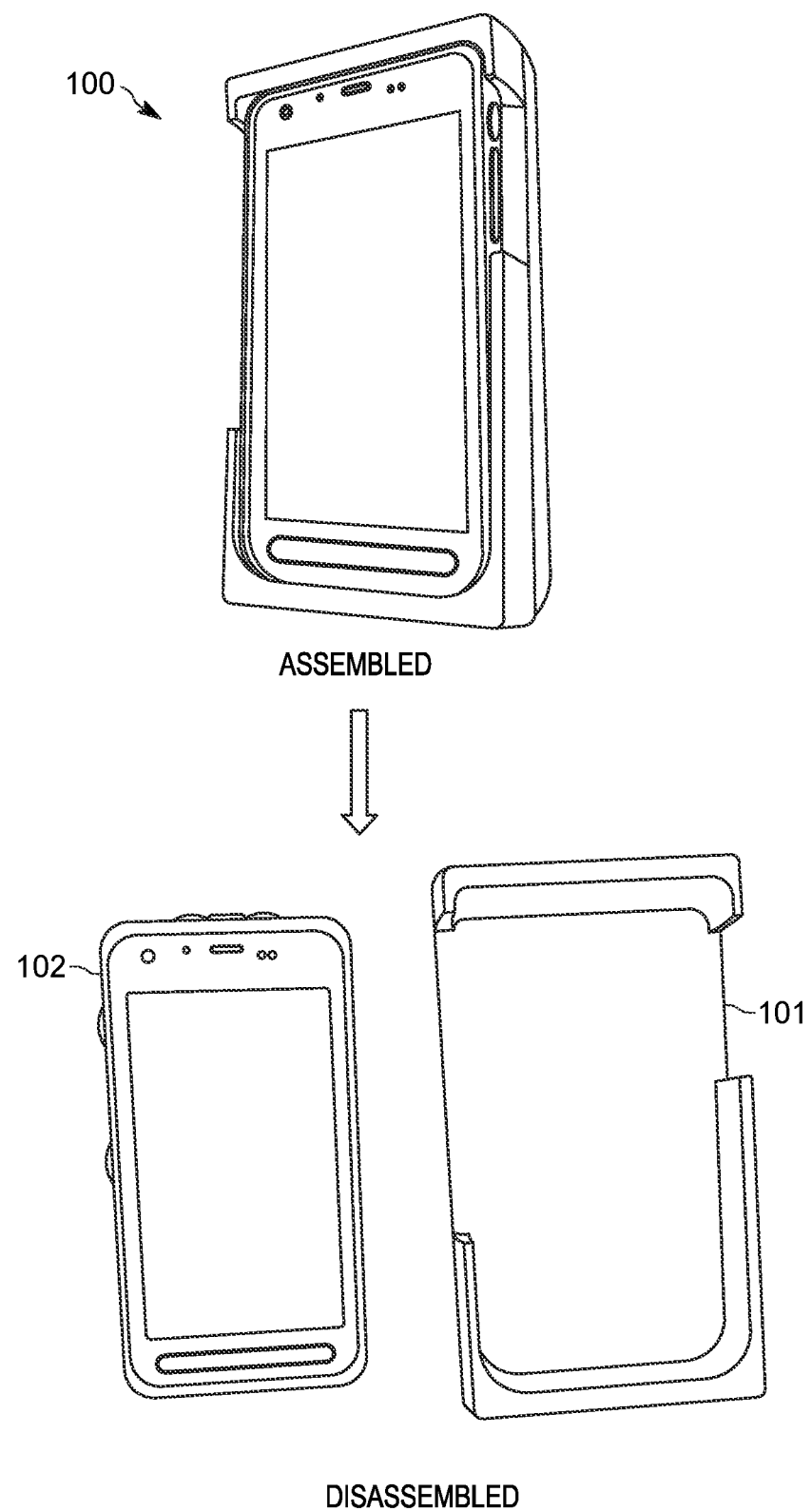
FIG. 1 is a device for radio-frequency emissions control, shown in assembled state and an unassembled state, in accordance with some examples.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

In mission critical situations, public-safety personnel, and the like, may communicate via radio-enabled devices that emit and/or radiate radio-frequency (RF) emissions. The RF emissions may be detected and used by a bad actor to detect the public-safety personnel. Further, a bad-actor may scramble radio channels over which the radio-enabled devices are communicating once they detect the frequencies of the radio channels.

Hence, provided herein is a system which includes a system device which communicates with radio devices via main radio channels and a control channel. The main radio channels are used by the radio devices for main communications such as exchanging audio, data, and the like. The control channel may be used by the system device to transmit control commands to the radio devices to control one or more of frequencies used by the radio devices, and reduce RF emissions emitted and/or radiated by the radio devices.

In some examples, a radio device may include: a commercial-off-the-shelf (COTS) device, and the like, which communicates according to Long-Term Evolution (LTE) standards and radio frequencies, and the like; and a communication device, which may be in the form of a sleeve, and the like, which attaches to the COTS device. The communication device/sleeve may be configured to at least partially surround the COTS device to isolate and/or absorb and/or shield RF emissions from the COTS device; however the communication device/sleeve emits and/or radiates RF emissions. Hereafter the terms "emit" and "radiate" are used interchangeably, and a device emitting and/or radiating RF emissions is understood to include hardware functionality of devices, as described herein, being used to control radio transmissions. The communication device/sleeve hence acts as an intermediary communication device which communicates with the system device and other radio devices (e.g. communication devices/sleeves at the other radio devices). In particular, the communication device/sleeve translates radio communications (e.g. LTE radio communications) on a frequency band of the COTS device, to frequencies used by the system device and/or the other radio devices and/or the communication devices/sleeves at the other radio devices. The radio communications (e.g. LTE radio communications) of the COTS device are hence not broadcast and/or transmitted, but received at the communication device/sleeve for translation. Furthermore, the communication device/sleeve communicates with the system device on the control channel and receives control commands therefrom.

In some examples, an RF emissions control command received at the communication device/sleeve may cause the communication device/sleeve to stop transmitting data (and/or the like) and/or stop communicating with the system device and/or the other radio devices (though the communication device/sleeve may continue to listen for transmissions from the system device and/or the other radio devices), and/or reduce RF emissions, while operation of the COTS device may continue. However, as the communication device/sleeve isolates and/or absorbs and/or shields RF emissions from the COTS device, the radio device, as a whole, has RF emissions reduced.

In other examples the RF emissions control command may cause the COTS device to stop communicating and/or reduce RF emissions such that the radio device, as a whole, has RF emissions reduced, for example as the communication device/sleeve is not receiving radio communications from the COTS device and hence is not transmitting translated radio communications.

While present examples are described with respect to a communication device/sleeve and a COTS device, the combined functionality of the COTS device and the communication device/sleeve may be combined into a single device and RF emissions thereof may be controlled via the RF emissions control command.

An aspect of the present specification provides a device comprising: a communication unit configured to communicate via main radio channels and a control channel, the main radio channels contributing to radio-frequency (RF) emissions; and a controller interconnected with the communication unit, the controller configured to: receive, via the communication unit communicating over the control channel, an RF emissions control command to reduce the RF emissions emitted by the communication unit; and in response to receiving the RF emissions control command, control one or more of the communication unit and activity on the main radio channels to reduce the RF emissions.

Another aspect of the present specification provides a method comprising: receiving, at a device via a communication unit communicating over a control channel, a radio-frequency (RF) emissions control command to reduce RF emissions emitted by the communication unit, the communication unit configured to communicate via main radio channels and the control channel, the main radio channels contributing to the RF emissions; and in response to receiving the RF emissions control command, controlling, at the device, one or more of the communication unit and activity on main radio channels to reduce the RF emissions.

Another aspect of the present specification provides a device comprising: a communication unit configured to communicate with one or more communication devices via at least a control channel, the one or more communication devices communicating via main radio channels; and a controller interconnected with the communication unit, the controller configured to: determine that radio-frequency (RF) emissions are to be reduced at one or more of the communication devices; and transmit, via the communication unit communicating over the control channel, to one or more of the communication devices, an RF emissions control command to reduce the RF emissions emitted by the one or more of the communication devices.

Another aspect of the present specification provides a method comprising: determining, at a device, that radio-frequency (RF) emissions are to be reduced at one or more communication devices, the device configured to communicate with the one or more communication devices via main radio channels and a control channel; and transmitting, by the device communicating over the control channel, to one or more of the communication devices, an RF emissions control command to reduce the RF emissions emitted by the one or more of the communication devices.

Attention is directed to FIG. 1, which depicts an example radio device 100 for radio-frequency emissions control, in accordance with some examples. The radio device 100 will interchangeably be referred to hereafter as the device 100 and/or the communication device 100.

As depicted, the device 100 comprises a first communication device 101 and a second communication device 102.

The first communication device 101 is provided in the form of a sleeve, and the like, which mates with and/or assembles with the second communication device 102. For example, the first communication device 101 generally comprises a housing adapted to receive and/or mate with and/or be assembled with a respective housing of the second communication device 102. In particular, FIG. 1 depicts the device 100 in an assembled state (e.g. at the top of FIG. 1) and a disassembled state (e.g. at the bottom of FIG. 1).

The second communication device 102 may be in the form of a commercial-off-the-shelf (COTS) device configured to communicate via a given and/or fixed frequency band, including, but not limited to, a Long-Term Evolution (LTE) frequency band, and the like. However, the second communication device 102 may be configured to communicate any suitable frequency band and/or frequency bands. While the second communication device 102 is described throughput the present specification with respect to a mobile communication device with a display screen, and the like (e.g. the second communication device 102 may comprise a commercial mobile phone and/or cell phone), the second communication device 102 may comprise a modem module, and the like, without a display screen (e.g. and a terminal device may be attached and/or in communication with such a modem module via a wired communication link (e.g. via a Universal Serial Bus (USB) port, and the like) and/or a local wireless communication (e.g. via Bluetooth™ communication link, a Wi-Fi communication link, a near-field communication (NFC) link, and the like)).

As will be explained hereafter, the first communication device 101 generally translates radio communications of the second communication device 102 between the second communication device 102 and a communication network and/or a base station and/or other radio devices. As will also be explained hereafter, the first communication device 101 generally isolates and/or absorbs and/or shields RF emissions from the second communication device 102.

For example, the first communication device 101 may be configured to communicate with the communication network and/or a base station and/or other radio devices via one or more frequencies, and the second communication device 102 may be configured to communicate via at least one given and/or fixed frequency band. The first communication device 101 generally converts radio communications between the communication network and the second communication device 102 between the one or more frequencies and the given and/or fixed frequency band. In general, the first communication device 101 converts the radio communications without access to the underlying data (e.g. LTE bits) being transmitted, which may be encrypted; rather, the first communication device 101 converts the radio communications between the one or more frequencies and the given and/or fixed frequency band, for example by converting a radio transmission between one or more frequencies and one or second frequencies of the given and/or fixed frequency band of the second communication device 102.

Hence, radio communications on radio channels between the communication network and the second communication device 102 are translated between the one or more frequencies and the at least one given and/or fixed frequency band via the first communication device 101. Hereafter, while reference is made to the second communication device 102 communicating on a given and/or fixed frequency band, it is understood that the second communication device 102 may communicate on more than one given and/or fixed frequency bands.

In general, the device 100 may be provided to a user who may use the device 100 to communicate with other devices, similar to the device 100, over the one or more frequencies, rather than the given and/or fixed frequency band of the first communication device 101, for example to better hide radio communications of the device 100 and/or prevent RF corruption of the radio communications by other radio transmissions, for example due to intentional jamming and/or unintentional interference. It is understood that a communication network and/or base station and/or other radio devices with which the device 100 is communicating is adapted to communicate over the one or more frequencies.

Figure 2:
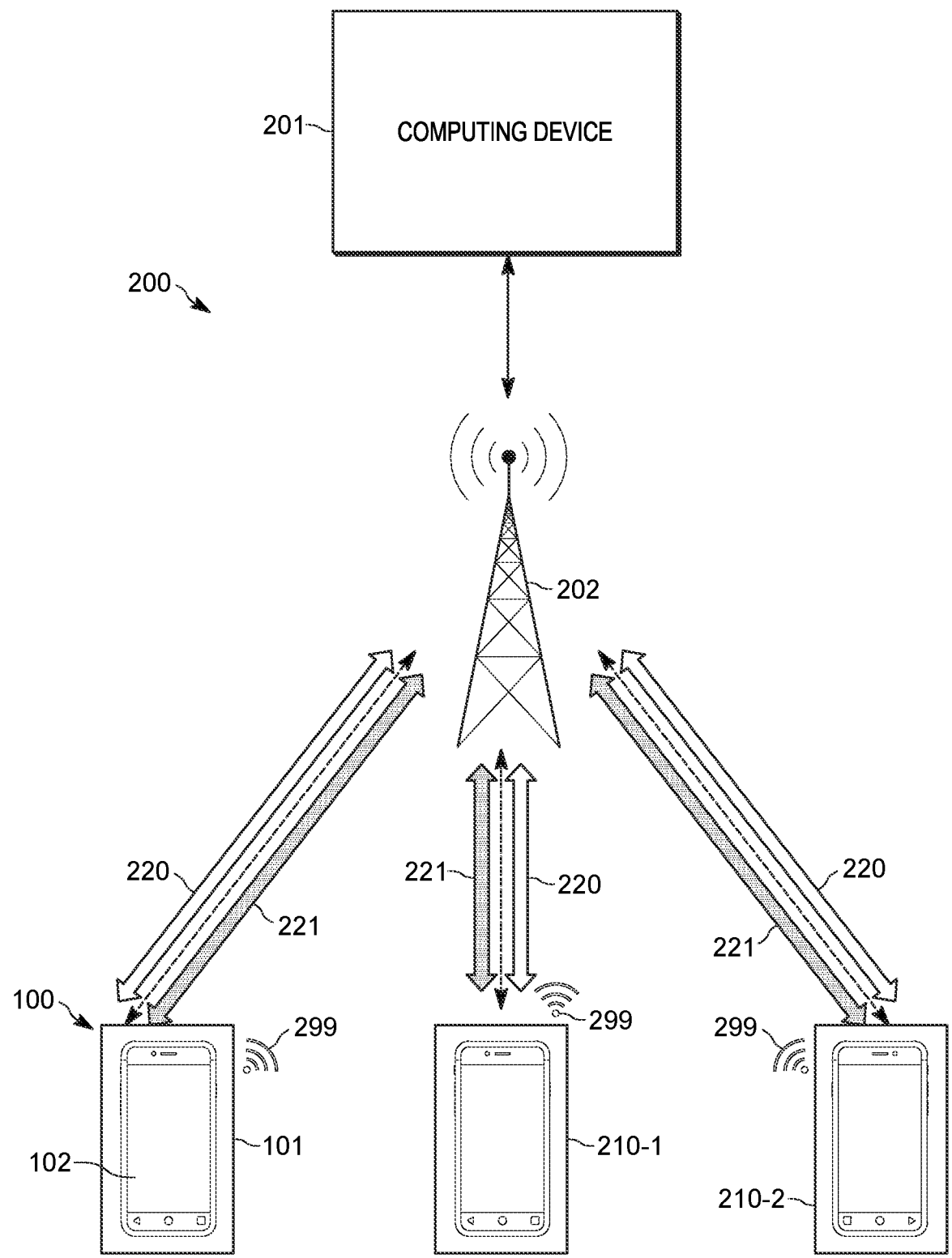
FIG. 2 is a system for radio-frequency emissions control, in accordance with some examples.

For example, attention is next directed to FIG. 2 which depicts a system 200 in which the device 100 is deployed. As depicted, the system 200 further comprises a computing device 201 in communication with a base station 202. In some examples, the computing device 201 may be separate from the base station 202, while in other examples, the computing device 201 may be integrated with the base station 202. The system 200 further comprises one or more further radio devices 210-1, 210-2, each of which may be similar to the device 100. The radio devices 210-1, 210-2 are interchangeably referred to hereafter, collectively, as the devices 210 and/or the communication devices 210, and generically, as a device 210 and/or a communication device 210. While two devices 210 are depicted, the system 200 may comprise as few as one device 210 or more than two devices 210.

Regardless, the devices 100, 210 wirelessly communicate with each other via the base station 202, for example via wireless communication links over frequencies of the first communication device 101. Indeed, communication links between components of the system 200 are depicted in FIG. 2, and throughout the present specification, as double-ended arrows between respective components; the communication links may include any suitable combination of wireless and/or wired links and/or wireless and/or wired communication networks.

The base station 202 may comprise a combination of one or more antennas and one or more transceivers. In some examples, the base station 202 may be omnidirectional. In other examples, the base station 202 may be configured to use beamforming, and the like, to confine and/or direct radiation and/or radio transmission of the main radio channels 220, and/or the control channel 221, to a device 100, 210, which may reduce a likelihood of bad-actors observing the radiation. In some of these examples, the base station 202 may beamform, and the like, in more than one direction, for example to a plurality of the devices 100, 210; in some of these examples control commands transmitted on the control channel 221 may be transmitted directionally and/or to a specific device 100, 210 and/or geographic region using the beamforming.

Furthermore while only one base station 202 is depicted, it is understood that the system 200 may comprise a plurality of base stations 202 providing wireless communications between the devices 100, 210. Furthermore, while the base station 202 is depicted as an antenna, the base station 202 may comprise a base station controller and/or a base station unit and/or a radio network controller and/or, when the base station 202 is configured for LTE communications, an eNode B device and/or an Enhanced Packet Core (EPC) device (e.g. which may control a plurality of base stations 202 and/or eNode B devices); such devices are generically referred to hereafter as communications control units. Transceivers of the base station 202 may be components of a communication control unit thereof. Furthermore, the computing device 201 may be in communication with more than one base station and/or more than one eNodeB devices, and the like, and/or the computing device 201 may be located at an EPC device, and the like.

In some examples, the computing device 201 may be in the form of a device which attaches and/or plugs into a communications control unit of the base station 202, for example to adapt the base station 202 to communicate over frequencies of the first communication device 101. The base station 202 may otherwise be for communicating over a given and/or fixed frequency bandwidth, for example LTE frequency bandwidths via the communications control unit.

As depicted, the devices 100, 210 communicate with each other and/or the computing device 201 via main radio channels 220 and a control channel 221, for example via communication links with the base station 202 and/or frequencies of the first communication device 101. In some examples, communication on the control channel 221 may be unidirectional from the computing device 201 to the devices 100, 210; however, in other examples, limited communication between the devices 201, 100, 210 may occur via the control channel 221.

Communications between the devices 100, 210 generally occur over the main radio channels 220. For example, the devices 100, 210 may exchange messages, phone calls, data, and the like over the main radio channels 220. The control channel 221, however, may be reserved for control commands from the computing device 201 to the devices 100, 210, as described in more detail below, though the devices 100, 210 may communicate with the computing device 201 via the control channel 221.

In some examples, communications between the devices 100, 210 via the main radio channels 220 may be via the computing device 201 and/or the computing device 201 may be configured to communicate via the main radio channels 220, as well as the control channel 221.

In some examples the control channel 221 may comprise one or more channels of the main radio channels 220 (e.g. a channel of the main radio channels 220 reserved for control commands) and/or the control channel 221 may be different from the main radio channels 220 and/or the control channel 221 may comprise one or more side channels to the main radio channels 220.

In some examples, frequencies over which the main radio channels 220 may be controlled, by the computing device 201 to frequency hop. In some of these examples, the control channel 220 may also be controlled to frequency hop, while in other examples the control channel 220 may be at a fixed frequency and/or may rotate through two or more fixed frequencies (e.g. according to a schedule). However, in other examples, such frequency hopping may not occur.

Regardless, the devices 100, 210 are generally configured to receive control commands from the computing device 201 via the control channel 221. When the control channel 221 is at a fixed frequency, the devices 100, 210 may be configured to communicate on the control channel 221 on the fixed frequency.

When the control channel 221 frequency hops and/or rotates through two or more fixed frequencies, the frequencies through which the control channel 221 hops and/or moves may be predetermined and preconfigured at the devices 100, 210, such that the devices 100, 210 scan through the predetermined frequencies to search through the predetermined frequencies to search for the control channel 221; in some of these examples, the computing device 201 may transmit a schedule of the predetermined frequencies to the devices 100, 210 via the control channel 221.

In other examples, when the control channel 221 frequency hops and/or rotates through two or more fixed frequencies, the frequencies through which the control channel 221 hops and/or moves, may not be predetermined and/or not preconfigured at the devices 100, 210. However, the computing device 201 may transmit a frequency and/or frequencies of the control channel 221, and/or a schedule thereof, via a beacon of the base station 202; such a beacon may comprise a radio communication broadcast, for example at a fixed frequency and/or frequencies over which information is periodically broadcast, and the like. Information broadcast via the beacon may be encrypted.

Indeed, any data exchanged between the computing device 201, the device 100 and the devices 201 may be encrypted.

As also seen in FIG. 2, each of the devices 100, 210 radiate RF emissions 299 as a result of communications on the main radio channels 220 and/or the control channel 221. As the first communication device 101 may shield RF emissions from the second communication device 102, the RF emissions 299 may comprise RF emissions from the first communication device 101 communicating over the main radio channels 220 and/or the RF emissions 299 may comprise RF emissions of the second communication device 102 leaking from first communication device 101.

As described hereafter an RF emissions control command transmitted on the control channel 221 by the computing device 201 may be used to cause the device 100 and/or the devices 210 to reduce the RF emissions 299.

Figure 3:
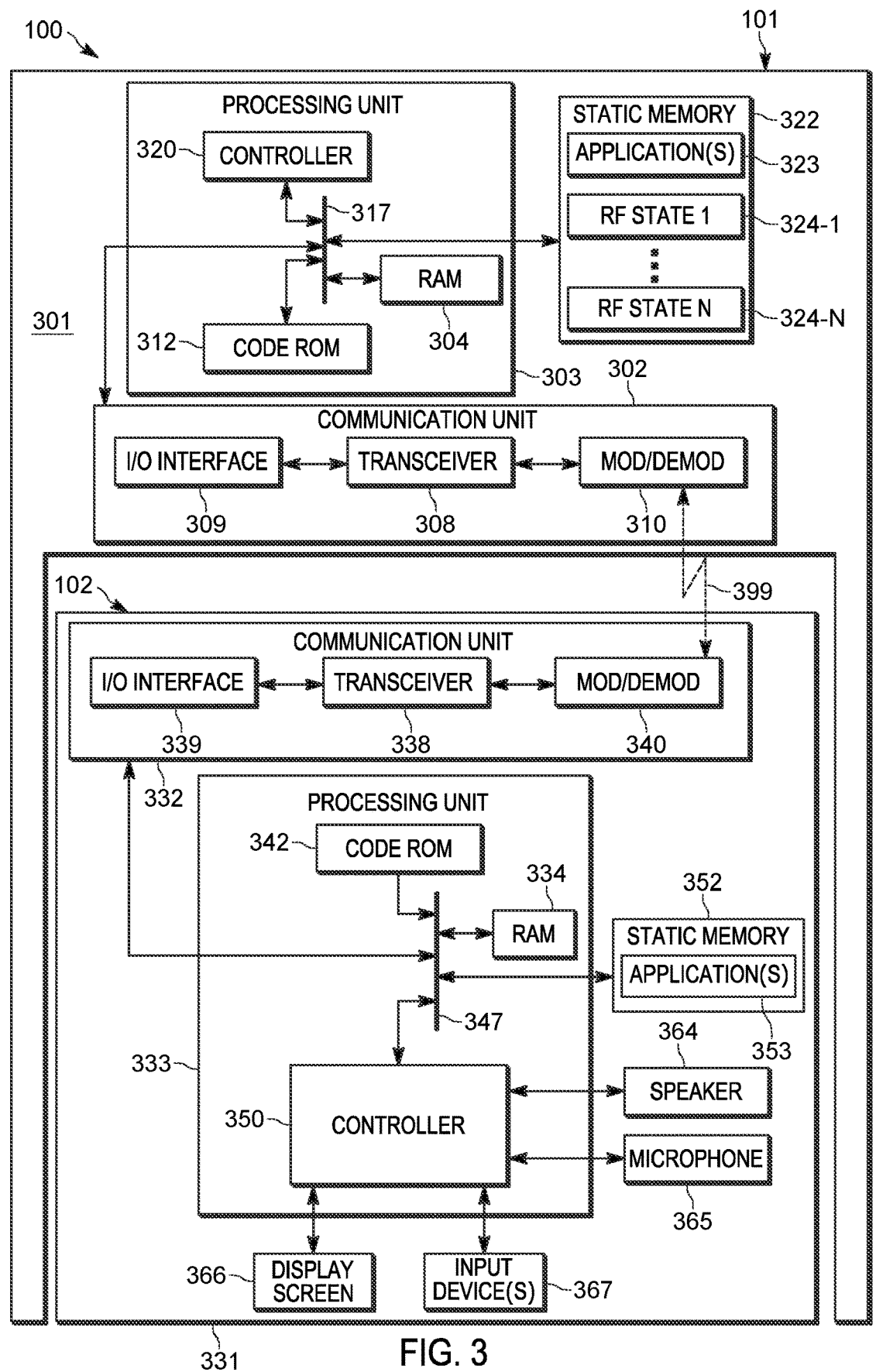
FIG. 3 is a device diagram showing a device structure of a radio device for radio-frequency emissions control, in accordance with some examples.

Attention is next directed to FIG. 3, which depicts a schematic block diagram of an example of the device 100.

In general, the device 100 may comprise the first communication device 101 and the second communication device 102. As depicted in FIG. 3, the first communication device 101 and the second communication device 102 are in the assembled state, similar to the assembled state depicted in FIG. 1. Furthermore, the computing devices 210 may have a configuration similar to the device 100, as shown in FIG. 3.

As depicted, the first communication device 101 comprises: a housing 301, a communication unit 302, a processing unit 303, a Random-Access Memory (RAM) 304, one or more wireless transceivers 308, one or more wired and/or wireless input/output (I/O) interfaces 309, a combined modulator/demodulator 310 (the transceiver(s) 308 coupled to the combined modulator/demodulator 310 and the I/O interfaces 309), a code Read Only Memory (ROM) 312, a common data and address bus 317, a controller 320, and a static memory 322 storing at least one application 323. Hereafter, the at least one application 323 will be interchangeably referred to as the application 323.

As depicted, the memory 322 further stores optional RF emissions state data 324-1 . . . 324-N (interchangeably referred to, collectively, as RF emissions state data 324 and/or a set of RF emissions state data 324). while an integer "N" of the RF emissions state data 324 are depicted, the memory 322 may optionally store as few as one set of RF emissions state data 324 and/or any suitable number of sets of RF emissions state data 324. In particular, a set of RF emissions state data 324 may comprise settings and/or instructions for controlling the first computing device 101 and/or the second computing device 102 to a particular RF emissions state, as described in more detail below.

Furthermore, each of the memories 312, 322 comprise non-transitory memories and/or non-transitory computer readable mediums.

As depicted, the second communication device 102 comprises: a housing 331, a communication unit 332, a processing unit 333, a RAM 334, one or more wireless transceivers 338, one or more wired and/or I/O interfaces 339, a combined modulator/demodulator 340 (the transceiver(s) 338 coupled to the combined modulator/demodulator 340 and the I/O interfaces 339), a code ROM 342, a common data and address bus 347, a controller 350, and a static memory 352 storing at least one application 353. Hereafter, the at least one application 353 will be interchangeably referred to as the application 353.

Furthermore, each of the memories 342, 352 comprise non-transitory memories and/or non-transitory computer readable mediums.

As depicted, the second communication device 102 further comprises a speaker 364, a microphone 365, a display screen 366, and one or more input devices 367 (e.g. a keyboard, a touch screen (e.g. of the display screen 366, buttons, knobs, pointing devices and the like), and/or any other components which enable a user to operate the second communication device 102, for example coupled to the controller 350 and/or the common data and address bus 347.

In some examples, as depicted, the devices 101, 102 are configured such that, when the devices 101, 102 are mated and/or assembled, the communication units 302, 332 and/or antennas thereof, align to assist in wireless communications therebetween; however, the devices 101, 102 may have any suitable configuration such that, when the devices 101, 102 are mated and/or assembled, the communication units 302, 332 wireless communicate, as described above.

For example, as depicted, the communication units 302, 332 are aligned and/or about aligned such that the communication units may wirelessly communicate. Furthermore, the housing 301 of the first communication device 101 receives the housing 331 of the second communication device 101 to isolate and/or absorb and/or shield the communication unit 332 from communicating with the base station 202 and/or other base stations and/or communication networks.

Rather, wireless transmissions of the communication unit 332, over a frequency band of the second communication device 102, are received at the communication unit 302, and translated to one or more frequencies of the first communication device 101, and are broadcast and/or transmitted on the one or more frequencies of the first communication device 101 for example to the base station 202. Similarly, wireless transmissions received at the communication unit 302 (e.g. from the base station 202) are received at the one or more frequencies of the first communication device 101, translated to the frequency band of the second communication device 102, and transmitted to the communication unit 332. Hence, from the viewpoint of the communication unit 332 and/or the second communication device 102, wireless communications are occurring via the frequency band thereof.

As shown in FIG. 3, the communication unit 302 is coupled to the common data and address bus 317 of the processing unit 303, and the communication unit 332 is coupled to the common data and address bus 347 of the processing unit 333.

The respective processing units 303, 333 may include a respective code ROM 312, 342 coupled to a respective common data and address bus 317, 347 for storing data for initializing respective device components. Respective processing units 303, 333 may further include respective controllers 320, 350 coupled, by respective common data and address buses 317, 347 to respective RAM 304, 334 and respective static memory 322, 352.

The communication units 302, 332 may include respective transceivers 308, 338 adapted for wireless communication with each other, as described above. For example, as depicted, a communication link 399 may be established between the combined modulators/demodulators 310, 340 (e.g. via respective antennas (not depicted) of the communication units 302, 304); while the communication link 399 is depicted in dashed lines to indicate a wireless communication link that may be established when the device 100 is "on" and/or operational (e.g. and which may not be present when the device 100 is "off" and/or non-operational), the communication link 399 may alternatively comprise a wired link between the devices 101, 102.

For example, the communication unit 332 and/or the transceiver 338 may be configured to communicate via a given and/or fixed frequency band, including, but not limited to, a frequency band of an LTE network, and/or any other suitable network, including but not limited to, one or more of: a Bluetooth network, a Wi-Fi network, for example operating in accordance with an IEEE 802.11 standard (e.g., 802.11a, 802.11b, 802.11g), a Worldwide Interoperability for Microwave Access (WiMAX) network, for example operating in accordance with an IEEE 802.16 standard, and/or another similar type of wireless network, and the like, such as cellular networks including the aforementioned LTE network and/or other types of 3rd Generation Partnership Project networks (3GPPP) (e.g. such as Global System for Mobile (GSM) communications networks, Universal Mobile Telecommunications Service (UMTS) networks, and the like), 5G ($5^{th}$ Generation) networks (e.g. a network architecture compliant with, for example, the 3GPP TS 23 specification series and/or a new radio (NR) air interface compliant with the 3GPP TS 38 specification series) standard), and the like. Indeed, the communication unit 332 and/or the transceiver 338 may be configured to communicate over a commercial network.

However, the communication unit 332 and/or the transceiver 338 may be configured to communicate via a frequency band of networks dedicated for use by first responders including, but not limited to or more of a digital mobile radio (DMR) network, a Project 25 (P25) network, and a terrestrial trunked radio (TETRA) network.

In contrast, the communication unit 302 and/or the transceiver 308 are configured to communicate with the communication unit 332 and/or the transceiver 338 via a frequency band thereof, and the communication unit 302 and/or the transceiver 308 are further configured to communicate via the one or more frequencies as described above; in some examples, the communication unit 302 may be configured to communicate with the computing device 201 and/or the devices 210 according to a frequency hopping scheme; however in other examples the communication unit 302 may be configured to communicate with the computing device 201 and/or the devices 210 without frequency hopping. In general, a respective bandwidth within which the one or more frequencies are located may be larger than the frequency bandwidth of the communication unit 332 and/or the transceiver 338.

The communication units 302, 332 may optionally include one or more wireline transceivers, such as an Ethernet transceiver, a USB (Universal Serial Bus) transceiver, or similar transceiver configurable to communicate via a twisted pair wire, a coaxial cable, a fiber-optic link, or a similar physical connection to a wireline network.

The controllers 320, 350 may include ports (e.g. hardware ports) for coupling to other hardware components. For example, the controller 350 may include ports for coupling to the speaker 364, the microphone 365, the display screen 366 and the one or more input devices 367.

The controllers 320, 350 includes one or more logic circuits, one or more processors, one or more microprocessors, one or more ASIC (application-specific integrated circuits) and one or more FPGA (field-programmable gate arrays), and/or another electronic device adapted for the respective functionality of the devices 101, 102.

The static memories 322, 352 are non-transitory machine readable media that stores respective machine readable instructions to implement one or more programs or applications. Example machine readable media include a non-volatile storage unit (e.g. Erasable Electronic Programmable Read Only Memory ("EEPROM"), Flash Memory) and/or a volatile storage unit (e.g. random-access memory ("RAM")). In the example of FIG. 3, programming instructions (e.g., machine readable instructions) that implement the functional teachings of the device 100 as described herein are maintained, persistently, at the memories 322, 352 and used by the controllers 320, 350, which makes appropriate utilization of volatile storage during the execution of such programming instructions.

For example, the memory 352 stores instructions corresponding to the at least one application 353 that, when executed by the controller 350, enables a user of the device 100 to interact with the second communications device 102 as an interface of the device 100 to send/receive audio, messages, data and the like. Indeed, the at least one application 353, when executed by the controller 350, generally enables the second communications device 102 to function as a mobile device.

Figure 5:
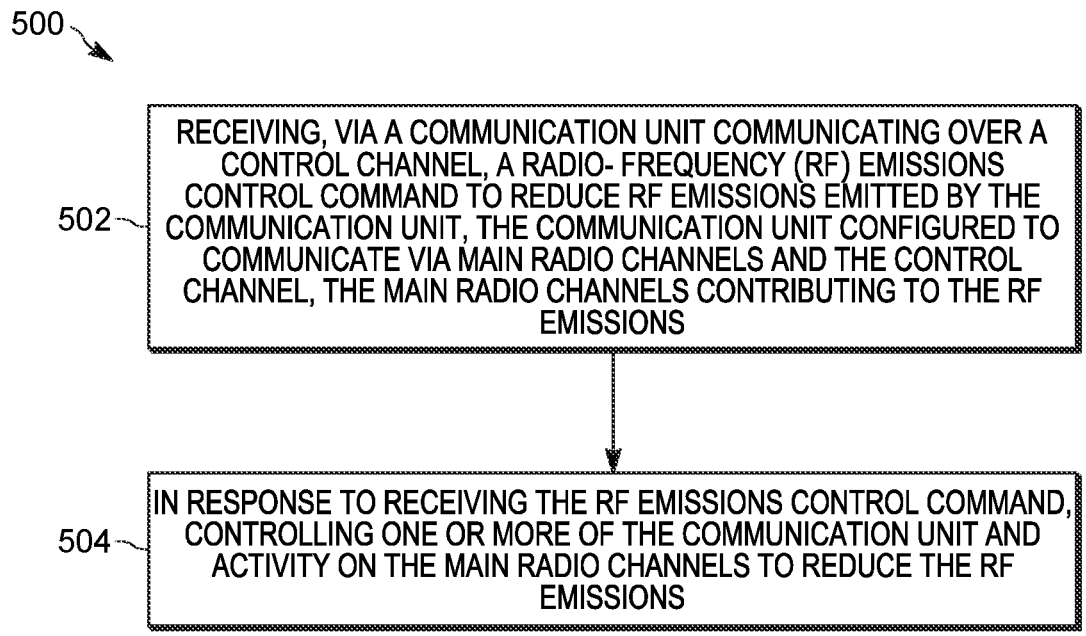
FIG. 5 is a flowchart of a method for radio-frequency emissions control, in accordance with some examples.

However, the memory 322 stores instructions corresponding to the at least one application 323 that, when executed by the controller 320, enables the controller 320 to implement functionality for radio-frequency emissions control including, but not limited to, the blocks of the method 500 set forth in FIG. 5.

Indeed, in some examples, the controller 320 and/or the first communication device 101 is not a generic controller and/or a generic device, but a controller and/or device specifically configured to implement functionality for radio-frequency emissions control. For example, in some examples, the controller 320 and/or the first communication device 101 may specifically comprises a computer executable engine configured to implement functionality for radio-frequency emissions control.

In illustrated examples, when the controller 320 executes the one or more applications 323, the controller 320 is enabled to: receive, via the communication unit 302 communicating over the control channel 221, an RF emissions control command to reduce the RF emissions 299 radiated by the communication unit 302 and/or the communication unit 332 and/or the device 100; and in response to receiving the RF emissions control command, control one or more of the communication unit 302 and/or the communication unit 332 and/or the device 100, and activity on the main radio channels 220, to reduce the RF emissions 299.

In some examples, the controllers 320, 350 may be interconnected and/or in communication with each other. For example, the controllers 320, 350 may be in wired communication via connectors of the devices 101, 102, and/or the controllers 320, 350 may be in wireless communication via the communication units 302, 332 of the devices 101, 102. In such examples, the controller 320 may be configured to instruct the controller 350 to control radio communications of the second communication device 102 during execution of the application 323.

Figure 4:
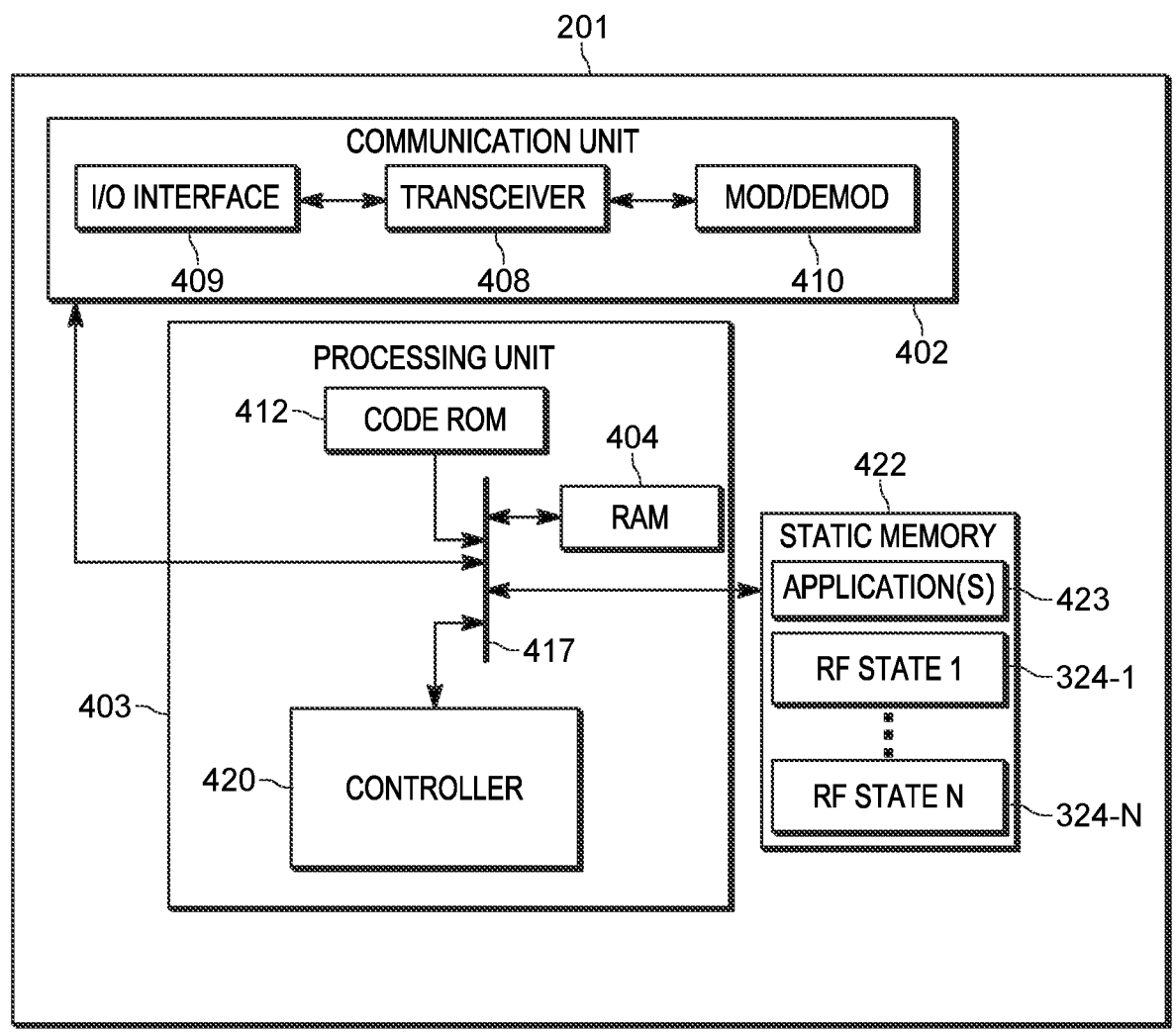
FIG. 4 is a device diagram showing a device structure of a computing device for controlling radio-frequency emissions at radio devices, in accordance with some examples.

Attention is next directed to FIG. 4, which depicts a schematic block diagram of an example of the computing device 201. In general, the device 201 may comprise a cloud computing device and/or a server and/or a device which plugs into a communications control unit of the base station 202 to adapt the base station 202 to communicate via one or more frequencies of the first communication device 101 via the main radio channels 220 and the control channel 221.

As depicted, the computing device 201 comprises: a communication unit 402, a processing unit 403, a Random- Access Memory (RAM) 404, one or more wireless transceivers 408, one or more wired and/or wireless I/O interfaces 409, a combined modulator/demodulator 410 (the transceiver(s) 408 coupled to the combined modulator/demodulator 410 and the I/O interfaces 409), a code ROM 412, a common data and address bus 417, a controller 420, and a static memory 422 storing at least one application 423. Hereafter, the at least one application 423 will be interchangeably referred to as the application 423. Furthermore, each of the memories 412, 422 comprise non-transitory memories and/or non-transitory computer readable mediums. As depicted the memory 422 optionally stores the RF emissions state data 324-1 . . . 324-N as described above.

While not depicted, the computing device 201 may further comprise one or more input devices, a display screen and/or the like and/or any components which enable a user to interact with the computing device 201, though a user may interact with the computing device 201 via external input devices, display screens, and the like. For example, a user operating a device at a control and command center may interact remotely with the computing device 201 via a backhaul of the base station 202

The communication unit 402 is coupled to the common data and address bus 417 of the processing unit 403. The processing unit 403 may include the code ROM 412 coupled the common data and address bus 417 for storing data for initializing respective device components. The processing unit 403 may further include the controller 420 coupled, by respective common data and address buses 417, to the RAM 304 and the static memory 422.

The communication unit 402 and/or the transceiver 408 are configured to communicate with the devices 100, 210 via the one or more frequencies of the device 100, as described above, which may or may not include a frequency hopping scheme as described above. Indeed, radio communication between the devices 100, 210 via the one or more frequencies of the device 100 may be facilitated by communication unit 402 and/or the transceiver 408.

The communication units 402 may optionally include one or more wireline transceivers, such as an Ethernet transceiver, a USB (Universal Serial Bus) transceiver, or similar transceiver configurable to communicate via a twisted pair wire, a coaxial cable, a fiber-optic link, or a similar physical connection to a wireline network.

The controller 420 may include ports (e.g. hardware ports) for coupling to other hardware components.

The controller 420 includes one or more logic circuits, one or more processors, one or more microprocessors, one or more ASIC (application-specific integrated circuits) and one or more FPGA (field-programmable gate arrays), and/or another electronic device adapted for the functionality of the computing device 201. Indeed, in some examples, the controller 420 and/or the computing device 201 is not a generic controller and/or a generic device, but a controller and/or a device specifically configured to implement functionality for controlling RF emissions of the devices 100, 210, and the like. For example, in some examples, the controller 320 and/or the first communication device 101 may specifically comprises a computer executable engine configured to implement functionality for controlling RF emissions of the devices 100, 210, and the like.

The static memory 422 is non-transitory machine readable medium that stores respective machine readable instructions to implement one or more programs or applications. Example machine readable media include a non-volatile storage unit (e.g. Erasable Electronic Programmable Read Only Memory ("EEPROM"), Flash Memory) and/or a volatile storage unit (e.g. random-access memory ("RAM")). In the example of FIG. 4, programming instructions (e.g., machine readable instructions) that implement the functional teachings of computing device 201 as described herein are maintained, persistently, at the memory 422 and used by the controller 420 which makes appropriate utilization of volatile storage during the execution of such programming instructions.

Figure 6:
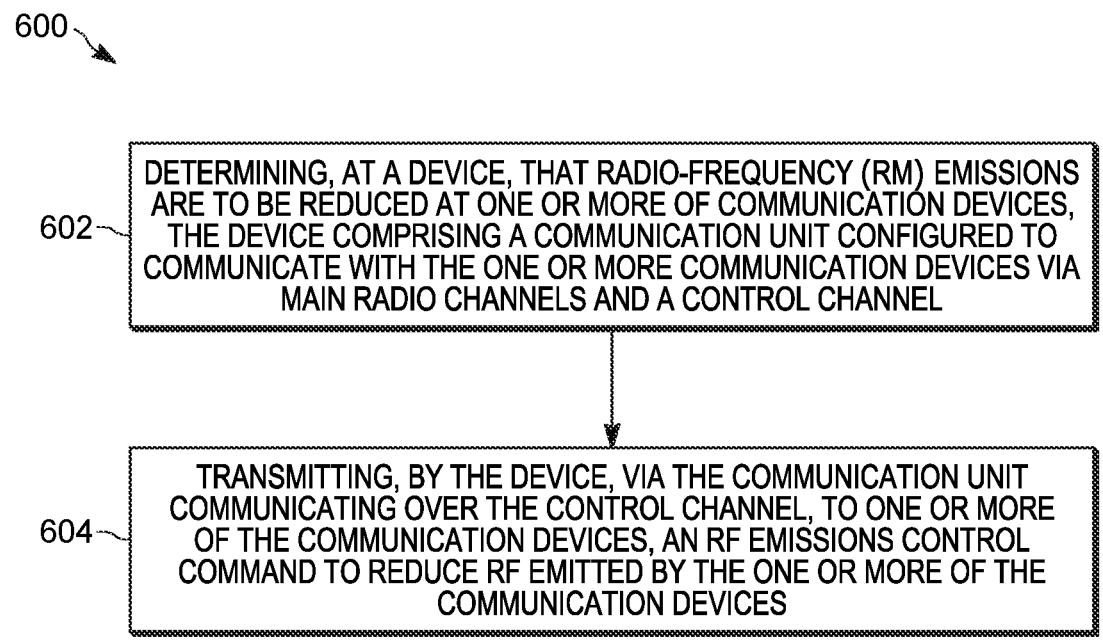
FIG. 6 is a flowchart of a method for controlling radio-frequency emissions at radio devices, in accordance with some examples.

However, the memory 422 stores instructions corresponding to the at least one application 423 that, when executed by the controller 420, enables the controller 420 to implement functionality for controlling RF emissions of the devices 100, 210, and the like including, but not limited to, the blocks of the method 600 set forth in FIG. 6.

In illustrated examples, when the controller 420 executes the one or more applications 423, the controller 420 is enabled to: determine that RF emissions 299 are to be reduced at one or more of the communication devices 100, 210; and transmit, via the communication unit 402 communicating over the control channel 221, to one or more of the communication devices 100, 210, an RF emissions control command to reduce the RF emissions 299 radiated by the one or more of the communication devices 100, 210.

Attention is now directed to FIG. 5, which depicts a flowchart representative of a method 500 for radio-frequency emissions control. The operations of the method 500 of FIG. 5 correspond to machine readable instructions that are executed by the device 100 (and/or the devices 210), and specifically by the controller 320 of the first communication device 101 of the device 100. In the illustrated example, the instructions represented by the blocks of FIG. 5 are stored at the memory 322 for example, as the application 323. The method 500 of FIG. 5 is one way in which the controller 320 and/or the first communication device 101 and/or the device 100 and/or the system 200 may be configured. Furthermore, the following discussion of the method 500 of FIG. 5 will lead to a further understanding of the system 200, and its various components. However, it is to be understood that the method 500 and/or the system 200 may be varied, and need not work exactly as discussed herein in conjunction with each other, and that such variations are within the scope of present examples.

The method 500 of FIG. 5 need not be performed in the exact sequence as shown and likewise various blocks may be performed in parallel rather than in sequence. Accordingly, the elements of method 500 are referred to herein as "blocks" rather than "steps." The method 500 of FIG. 5 may be implemented on variations of the system 200, as well. For example, the method 500 may be implemented by a single device that includes the combined functionality of the devices 101, 102 (e.g. such a single device generally configured to wirelessly communicate over any suitable frequencies). In other words, the method 500 may be implemented in a device that does not include a sleeve similar to the first communication device 101, but rather the method 500 may be implemented in any suitable mobile, or fixed, communication device, and the like (e.g. similar to the second communication device 102); indeed, in some examples, the method 500 may be implemented at the second communication device 102 without the first communication device 101.

At a block 502, the controller 320 and/or the first communication device 101 and/or the device 100 receives, via the communication unit 302 communicating over the control channel 221, an RF emissions control command to reduce the RF emissions 299 emitted (and/or radiated) by the communication unit 302 (and/or the communication unit 332 and/or the device 100). For example, the RF emissions control may be received from the computing device 201 via the base station 202.

At a block 504, the controller 320 and/or the first communication device 101 and/or the device 100, in response to receiving the RF emissions control command, controls one or more of the communication unit 302 (and/or the communication unit 332 and/or the device 100) and activity on the main radio channels 220 to reduce the RF emissions 299.

In some examples, the controller 320 and/or the first communication device 101 and/or the device 100 controls the RF emissions 299 by implementing RF emissions control at the first communication device 101; however, in other examples, the controller 320 and/or the first communication device 101 and/or the device 100 controls the RF emissions 299 by implementing RF emissions control at the second communication device 102, for example by way of the controllers 320, 350 communicating with each other. Hence, while hereafter RF emissions control is described as occurring at the second communication device 102, such RF emissions control may alternatively occur at the second communication device 102 and/or one or more of the devices 101, 102.

For example, the RF emissions control command may comprise an indication of a given RF emissions state, for example as indicated by the RF emission state data 324. Hence, in some examples, the RF emissions control command may comprise an identifier of a set of RF emission state data 324, and the controller 320 may retrieve the identified set of RF emission state data 324 and control the communication unit 302 (and/or the communication unit 332 and/or the device 100) accordingly. Alternatively, the computing device 201 may select a set of RF emission state data 324 as stored at the memory 422 and transmit the selected set of RF emission state data 324 as the RF emissions control command and/or in the RF emissions control command.

A given RF emissions state indicated by a set of RF emission state data 324 generally corresponds to a state of the communication unit 302 (and/or the communication unit 332 and/or the device 100) where fewer RF emissions 299 are radiated than during a "normal" operating state of the device 100 and/or a current operating state of the device 100 (e.g. prior to receiving the RF emissions control command).

However, in other examples, the memory 322 may not store RF emission state data 324; rather, the RF emissions control command may comprise a set of RF emissions state data indicating a given RF emissions state to which the communication unit 302 (and/or the communication unit 332 and/or the device 100) is to be controlled.

Regardless, the RF emissions control command comprises an indication of a given RF emissions state, and the controller 320 and/or the first communication device 101 and/or the device 100 may be further configured to control one or more of the communication unit 302 (and/or the communication unit 332 and/or the device 100) and the activity on the main radio channels 220 to reduce the RF emissions 299 to between an emissions state lower than a current emissions state and the given RF emissions state.

In some examples, the given RF emissions state may comprise a silent RF emissions state to reduce the RF emissions 299 to zero, for example where no RF emissions 299 are radiated by the communication unit 302 (and/or the communication unit 332 and/or the device 100). However, the given RF emissions state may be any suitable type. In some examples, the given RF emissions state may comprise a whisper RF emissions state to reduce the RF emissions 299 to a given reduced level where, for example, certain types of radio communications, such as text messages, may occur.

For example, the controller 320 and/or the first communication device 101 and/or the device 100 may be further configured to control one or more of the communication unit 302 (and/or the communication unit 332 and/or the device 100) and the activity on the main radio channels 220 to reduce the RF emissions 299 by one or more of:

Reducing a transmit power of the communication unit 302. For example, the transmit power of the communication unit 302 may be controlled to reduce to a given transmit power, which may for example, be low enough to transmit certain types of communications to the base station 202, such as text messages, but not other types of communications, such as audio, video, and the like. However, the transmit power may be reduced such that no transmissions of may occur; for example, the transmit power of the communication unit 302 may be turned off. Similarly, the transmit power of the communication unit 332 may be reduced and/or turned off.

Reducing a data rate. For example, the data rate of the communication unit 302 may be controlled to reduce to a given data rate, which may for example, be low enough to transmit certain types of communications to the base station 202, such as text messages, but not other types of communications, such as audio, video, and the like. However, the data rate may be reduced such that no transmissions of may occur. Similarly, the transmit power of the communication unit 332 may be reduced.

Reducing a modulation state (e.g. which may be a particular example of reducing the data rate, for example to increase transmission range of data while maintaining a transmit power). For example, the modulation state of the communication unit 302 may be controlled to reduce to a given modulation state, which may for example, be low enough to transmit certain types of communications to the base station 202, such as text messages, but not other types of communications, such as audio, video, and the like. However, the modulation state may be reduced such that no transmissions of may occur. Similarly, the modulation state of the communication unit 332 may be reduced.

Limiting transmissions to other devices 210 associated with a class of users. For example, the devices 210 may be used by different types of users associated with different classes. In one example, the users of the other devices 210 may have different ranks and/or roles in a hierarchical data structure; as such, the memory 322 may store, for example identifiers of devices 210 in association with classes of respective users (e.g. respective ranks of the users) (e.g. at a set of RF emissions state data 324 and/or separate therefrom). Such identifiers and/or class of users may also be received with the RF emissions control command. Hence, when limiting transmissions to other devices 210 associated with a class of users the controller 320 and/or the first communication device 101 and/or the device 100 may restrict transmissions by the controller 320 and/or the first communication device 101 and/or the device 100 to devices 210 of a given class and/or classes of users (e.g. devices 210 operated by users having a rank of captain and above).

Refusing respective transmission from other devices 210 associated with a given classes of users. For example, audio and/or video calls may be refused from other devices 210 associated with a given classes of users.

Controlling a spreading factor; for example, the first communication device 101 may communicate using spread spectrum techniques, and a spreading factor may be used to "spread" transmission of data over a frequency bandwidth. It is understood that as a frequency bandwidth is widened, the RF emissions 299 are reduced at any one frequency.

Altering one or more of: a sleep cycle, a silent periodicity cycle and a duty cycle. For example, a sleep cycle and/or a silent periodicity cycle and/or a duty cycle may be increased so that transmissions of data are reduced as compared to a current sleep cycle and/or a current silent periodicity cycle and/or a current duty cycle. In other words, a time period between transmissions of data is lengthened, which reduces the overall emission of the RF emissions 299.

Limiting transmit opportunities. For example, similar to reducing duty cycle, the first communication device 101 may be limited to transmitting data within given time periods, for example, once every 10 minutes, and the like, and/or a length of such transmissions may be limited.

Refusing given classes of data traffic. For example, audio and/or video calls may be refused as such data traffic results in subsequent increases in RF emissions 299.

Modifying an uplink scheduling algorithm. For example, the controller 320 and/or first communications device 101 and/or the device 100 may have a schedule for attempting to establish uplink communications with the base station 202; as such, a timer period between uplink attempts may be increased.

However, any suitable mode for controlling one or more of the communication unit 302 (and/or the communication unit 332 and/or the device 100) and the activity on the main radio channels 220 to reduce the RF emissions 299 is within the scope of the present specification.

Regardless, in the modes described above, the communication unit 302 may continue to receive control commands on the control channel 221. For example, the computing device 201 may continue to transmit pings, and the like, on the control channel 221 to maintain a downlink with the devices 100, 210, and/or may transmit a second RF communications command to the devices 100, 210 to resume normal radio communications thereby increasing the RF emissions 299.

Hence, the method 500 may further comprise, the controller 320 and/or the first communication device 101 and/or the device 100: receiving a second RF emissions control command to increase the RF emissions 299; and in response to receiving the second RF emissions control command, control one or more of the communication unit 302 (and/or the communications unit 332 and/or the device 100), and activity on the main radio channels 220, to increase the RF emissions 299.

In some examples, the method 500 may further comprise, the controller 320 and/or the first communication device 101 and/or the device 100: when communication with the control channel 221 is lost, control one or more of the communication unit 302 (and/or the communications unit 332 and/or the device 100) and the activity on the main radio channels 220 to reduce the RF emissions 299 to one or more of a silent RF emissions state and a low RF emissions state (e.g. the aforementioned whisper RF emissions state), the silent RF emissions state to reduce the RF emissions 299 to zero, and the low RF emissions state to reduce the RF emissions 299 to below a given RF emissions level, as described above. Hence, for example, the computing device 201 may periodically transmit pings, and the like, on the control channel 221; and, when the controller 320 and/or the first communication device 101 and/or the device 100 fails to receive a ping, and/or any other data on the control channel 221, for a given period of time, the controller 320 and/or the first communication device 101 and/or the device 100 may determine that communication with the control channel 221 is lost and respond accordingly. Indeed, such loss of communication may indicate that a bad actor has taken control of the computing device 201.

However, in other examples, the method 500 may further comprise, the controller 320 and/or the first communication device 101 and/or the device 100: when communication with the control channel 221 is lost, control a notification device at the device 100 to provide an indication of the control channel 221 being lost. In some examples, such a prompt may be include selectable actions (e.g. in form of menu items, buttons, and the like, provided at a display screen of the device 100) that may be taken in response to the control channel 221 being lost; such actions may include the device 100 continuing to function "normally" (e.g. transmitting and/or receiving data), controlling the device 100 to a "default" state (e.g. setting of which may be preconfigured at one or more memories 322, 352 and which may be selected by a user of the device 100), controlling the activity on the main radio channels 220 to reduce the RF emissions 299 to o a silent RF emissions state and/or a low RF emissions state, and the like, and/or any other suitable action. Such a prompt may enable a user of the device 100 to control the action taken by the device 100 when the control channel 221 is lost.

In some examples, when the RF control command is received and/or when the RF emissions 299 are reduced, the controller 320 and/or the controller 350 may control the display screen 366 to render an indication of the RF emissions 299 being reduced and/or a mode thereof, as described above. Such an indication may further be indicative of an emergency and/or a situation within the environment of the system 200 that may be dangerous to the users of the devices 100, 210.

Attention is now directed to FIG. 6, which depicts a flowchart representative of a method 600 for controlling devices to reduce RF emissions. The operations of the method 600 of FIG. 6 correspond to machine readable instructions that are executed by the computing device 201, and specifically by the controller 420 of the computing device 201. In the illustrated example, the instructions represented by the blocks of FIG. 6 are stored at the memory 422 for example, as the application 423. The method 600 of FIG. 6 is one way in which the controller 420 and/or the computing device 201 and/or the system 200 may be configured. Furthermore, the following discussion of the method 600 of FIG. 6 will lead to a further understanding of the system 200, and its various components. However, it is to be understood that the method 600 and/or the system 200 may be varied, and need not work exactly as discussed herein in conjunction with each other, and that such variations are within the scope of present examples.

The method 600 of FIG. 6 need not be performed in the exact sequence as shown and likewise various blocks may be performed in parallel rather than in sequence. Accordingly, the elements of method 600 are referred to herein as "blocks" rather than "steps." The method 600 of FIG. 6 may be implemented on variations of the system 200, as well.

At a block 602, the controller 420 and/or the computing device 201 determines that RF emissions 299 are to be reduced at one or more of the communication devices 100, 210.

For example, one or more of the devices 100, 210 may transmit an emergency command (and the like) to the computing device 201 (e.g. on the control channel 221 and/or a main radio channel 220) that indicates that RF emissions 299 are to be reduced at the devices 100, 210. Such an emergency command may be indicative of an emergency and/or a situation within the environment of the system 200 that may be dangerous to the users of the devices 100, 210. In some of these examples, one or more of the devices 100, 210 may include an emergency button, and the like, which, when actuated, may cause such an emergency command to be transmitted; such an emergency button may be a physical button (e.g. at the first communication device 101 and/or the second communication device 102) and/or a virtual button (e.g. provided at the display screen 366 of the second communication device 102).

Alternatively, an emergency command, and the like, may be received at the computing device 201 from a device of a control and command center, which may communicate with the computing device 201 via a backhaul of the base station 202.

Alternatively, an emergency command, and the like, may be received at the computing device 201 from one or more sensors (not depicted) deployed in the system 200 which may detect data indicative of an emergency and/or a situation within the environment of the system 200 that may be dangerous to the users of the devices 100, 210.

Alternatively, the computing device 201 may comprise tamper sensors such that when tampering is senses at the computing device 201, the computing device 201 may determine that RF emissions 299 are to be reduced at one or more of the devices 100, 210 as such tampering may indicate that a bad actor is attempting to take control of the computing device 201 and communications in the system 200 may be compromised. Similarly, the controller 420 and/or the computing device 201 may be configured to detect hacking, and the like, for example via a communication network and determine that RF emissions 299 are to be reduced at one or more of the devices 100, 210 as such hacking may indicate that a bad actor is attempting to take control of the computing device 201 and communications in the system 200 may be compromised.

However, any suitable process for determining that RF emissions 299 are to be reduced at one or more of the communication devices 100, 210 is within the scope of the present specification At a block 604, the controller 420 and/or the computing device 201 transmits, via the communication unit 402 communicating over the control channel 221, to one or more of the communication devices 100, 210, an RF emissions control command to reduce the RF emissions 299 emitted (and/or radiated) by the one or more of the communication devices 100, 210, as described above.

For example, the emergency command, and the like, may indicate a type and/or degree of an emergency and/or situation, and the RF emissions control command may cause one or more of the communication devices 100, 210 to reduce the RF emissions 299 accordingly. For example, in some situations (e.g. emergency situations) it may be desirable for all the communication devices 100, 210 to enter a silent RF emissions state.

In other situations, it may be desirable for a first subset of the communication devices 100, 210 to enter a silent RF emissions state, while a second subset of the communication devices 100, 210 may enter a whisper RF emissions state where, for example, certain outgoing transmissions, such as text messages, may occur. For example, devices 100, 210 of users of a rank (e.g. a class) of captain, and above, may be enabled to transmit text messages on the main radio channels 220, whereas devices 100, 210 of users below the rank of captain may enter a silent RF emissions state.

Hence, in some examples, the method 600 may further comprise the controller 420 and/or the computing device 201: determining a subset of the one or more communication devices 100, 210 for which RF emissions 299 are to be reduced, wherein the RF emissions control command is to reduce the RF emissions 299 emitted (and/or radiated) by the subset. As described above, determination of the subset may be based on rank and/or a given class, and the like, of users of the devices 100, 210. Hence, for example, the control command may include identifiers of devices 100, 210 that are reduce the RF emissions 299; the devices 100, 210 may receive the control command and when the control command includes a respective identifier of a device 100, 210 receiving the control command, the device 100, 210 having the respective identifier may reduce RF emissions 299 accordingly. In some of these examples the control command may include identifiers of the devices 100, 210 in association with a respective set of RF emission state data 324, and the device 100, 210 having a respective identifier may reduce RF emissions 299 according to the respective set of RF emission state data 324.

In yet further examples, when the base station 202 includes beamforming functionality, the controller 420 and/or the computing device 201 may determine a subset of the one or more communication devices 100, 210 for which RF emissions 299 are to be reduced and transmit a one or more respective control commands to the subset via beamforming (e.g. and a respective control command may not be transmitted to device 100, 210 which are not in the subset). Indeed, such beamforming may be used to control the devices 100, 210 to reduce RF emissions 299 based on a geographic location of the devices 100, 210.

In some examples, a class of a situation that may be occurring within the environment of the system 200 may be such that transmissions to the devices 100, 210 may be limited and/or reduced. For example, the method 600 may further comprise the controller 320 and/or the computing device 201: refraining from transmitting communications to a subset of the one or more communication devices 100, 210, (e.g. on the control channel 221 and/or on the main radio channels 220).

Eventually, however, the emergency and/or a situation within the environment of the system 200 that may have been dangerous to the users of the devices 100, 210 may end. The end of such a situation may be determined by receipt of an end emergency and/or all clear command from one or more of the devices 100, 210, a control center device and/or may be determined via the aforementioned sensors. Regardless, the method 600 may further comprise, the controller 420 and/or the computing device 201: determining that the radio-frequency RF emissions 299 are to resume at the one or more of the communication devices 100, 210; and transmitting, via the communication unit 402 communicating over the control channel 221, to one or more of the communication devices 100, 210, a control command to resume the RF emissions 299 and/or normal radio communications.

In some examples, the controller 420 and/or the computing device 201 may perform a validation procedure prior to transmitting the all clear command, for example by way of the aforementioned sensors (e.g. sensors may be used to validate that an emergency has ended, for example when an all clear command is received from a control center device).

Furthermore, as described above, the computing device 201 may select a set of RF emission state data 324 as stored at the memory 422 and transmit the selected set of RF emission state data 324 as the RF emissions control command and/or in the RF emissions control command.

Figure 7:
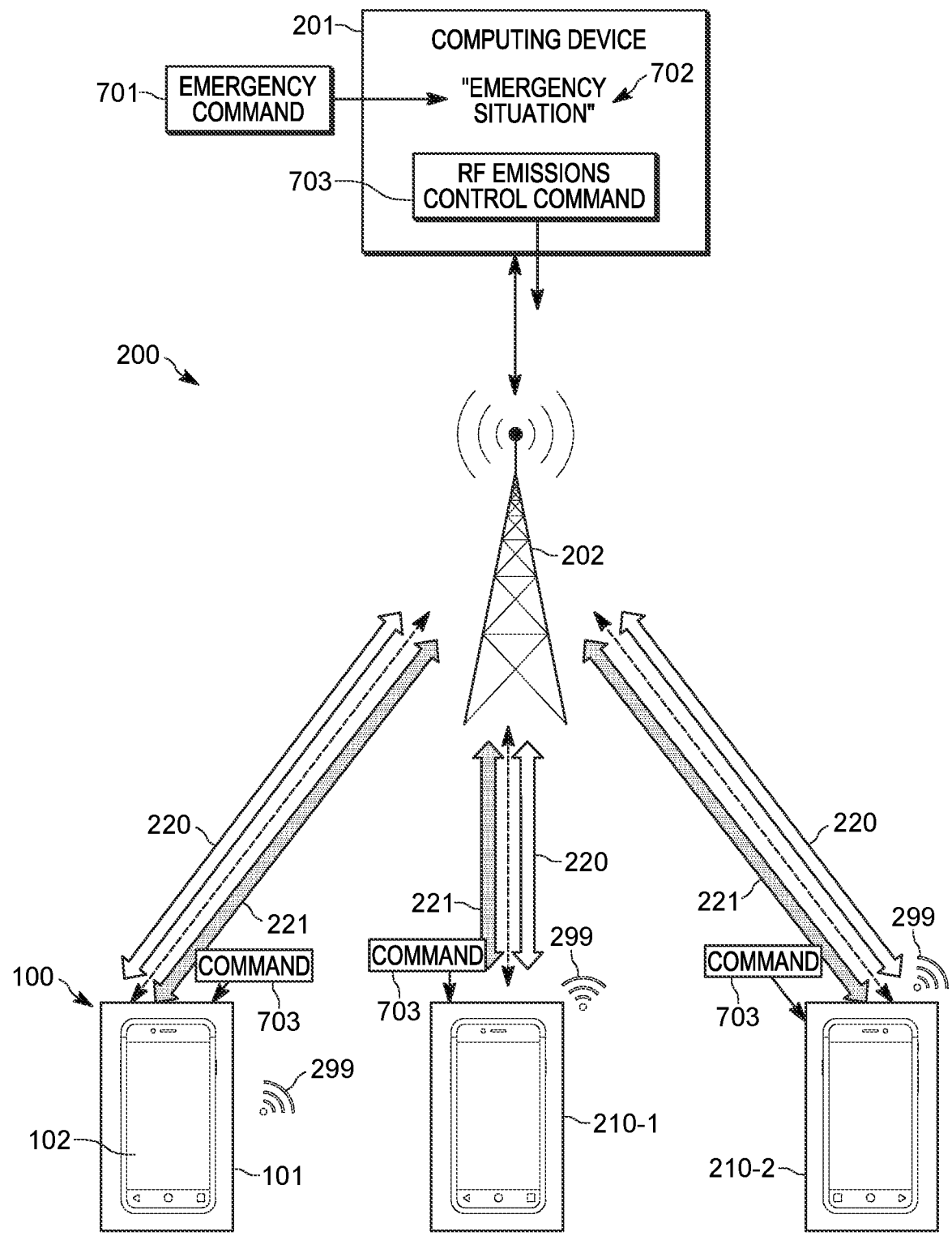
FIG. 7 depicts the system of FIG. 2 implementing a portion of a method for radio-frequency emissions control, in accordance with some examples.
Figure 8:
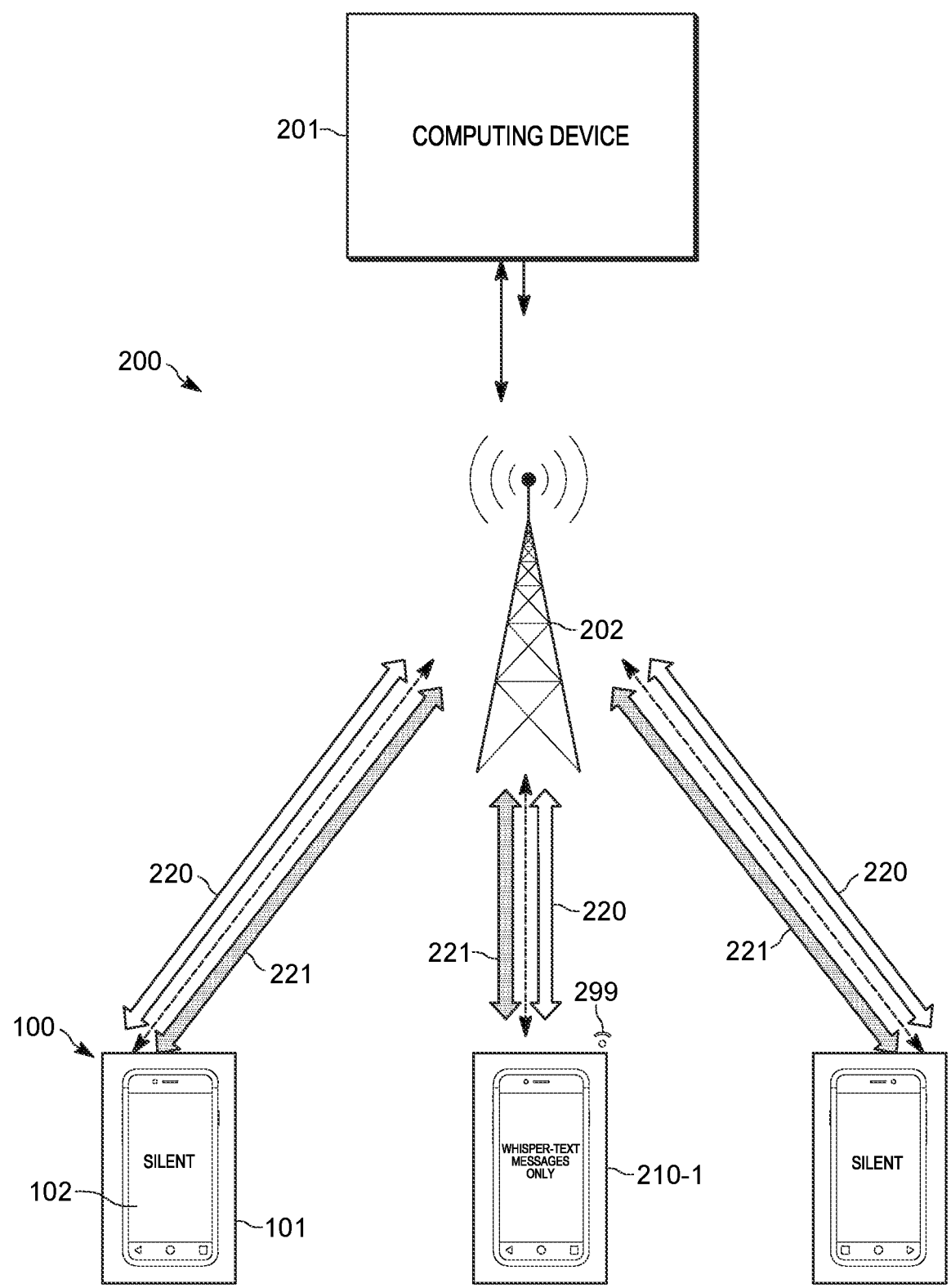
FIG. 8 depicts the system of FIG. 2 completing implementation of the method for radio-frequency emissions control, in accordance with some examples.

Attention is next directed to FIG. 7 and FIG. 8 which depicts examples of the method 500 and the method 600. FIG. 7 and FIG. 8 are similar to FIG. 2, with like components having like numbers.

FIG. 7 depicts the computing device 201 receiving an emergency command 701, as described above, and determining 702 that an emergency situation is occurring; as result of the emergency situation, the computing device 201 determines (e.g. at the block 602 of the method 600) that the RF emissions 299 are to be reduced at one or more of the communication devices 100, 210 and transmits (e.g. at the block 604 of the method 600) and/or broadcasts an RF emissions control command 703 on the control channel 221.

As also depicted in FIG. 7, the devices 100, 210 receive (e.g. at the block 502 of the method 500) the RF emissions control command 703 on the control channel 221.

With attention next directed to FIG. 8, in response to receiving the RF emissions control command 703, the devices 100, 210 reduce (e.g. at the block 504 of the method 500) the RF emissions 299 as described above. As depicted, the devices 100, 210-2 are placed into a silent RF emissions state where respective RF emissions 299 are reduced to zero; further, respective display screens thereof are controlled to provide an indication "Silent" to indicate the silent emissions state, thereby letting users of the devices 100, 210-2 know that radio communications have been silenced and/or of the emergency situation.

In contrast, the device 210-1 is placed into a whisper RF emissions state where respective RF emissions 299 are reduced to a level where only text messages may be transmitted. For example, a user of the device 210-1 may be of a higher rank than users of the devices 100, 210-2. A respective display screen of the device 210-1 is controlled to render an indication "Whisper-Text Messages Only" to indicate the whisper RF emissions state, thereby letting the user of the devices 210-1 know that radio communications have been reduced to text messages only and/or of the emergency situation. In these examples, the control command 703 transmitted to each of the devices 100, 210 may indicate a respective RF state to which a device 100, 210 is to be controlled; alternatively, a respective and/or different control command 703 may be transmitted to each of the devices 100, 210 to indicate a respective RF state to which a device 100, 210 is to be controlled.

While not depicted, radio communications between the devices 100, 210 may resume when a reverse process occurs in the system 200 (e.g. an end emergency and/or all clear command may be received at the computing device 201 which causes the computing device 201 to transmit a control command to transmit the RF emissions 299 and/or normal radio communications to the devices 100, 210).

In the foregoing specification, specific embodiments have been described. However, one of ordinary skill in the art appreciates that various modifications and changes may be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

In this document, language of "at least one of X, Y, and Z" and "one or more of X, Y and Z" may be construed as X only, Y only, Z only, or any combination of two or more items X, Y, and Z (e.g., XYZ, XY, YZ, XZ, and the like). Similar logic may be applied for two or more items in any occurrence of "at least one . . . " and "one or more . . . " language.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment may be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it may be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A device comprising:
   a communication unit configured to communicate via main radio channels and a control channel, the main radio channels contributing to radio-frequency (RF) emissions; and
   a controller interconnected with the communication unit, the controller configured to:
      receive, via the communication unit communicating over the control channel, an RF emissions control command to reduce the RF emissions emitted by the communication unit; and
      in response to receiving the RF emissions control command, control one or more of the communication unit and activity on the main radio channels to reduce the RF emissions,
      wherein the RF emissions control command comprises an indication of a given RF emissions state, and the controller is further configured to:
      control one or more of the communication unit and the activity on the main radio channels to reduce the RF emissions to between an emissions state lower than a current emissions state and the given RF emissions state.

2. The device of claim 1, wherein the given RF emissions state comprises a silent RF emissions state to reduce the RF emissions to zero.

3. The device of claim 1, wherein the controller is configured to control one or more of the communication unit and the activity on the main radio channels to reduce the RF emissions by one or more of:
   reducing a transmit power of the communication unit;
   reducing a data rate;
   reducing a modulation state;
   controlling a spreading factor;
   limiting transmissions to other devices associated with a class of users;
   refusing respective transmissions from the other devices associated with the class of users;
   altering one or more of: a sleep cycle, a silent periodicity cycle and a duty cycle;
   limiting transmit opportunities;
   refusing given classes of data traffic; and
   modifying an uplink scheduling algorithm.

4. The device of claim 1, wherein the controller is configured to:
   when communication with the control channel is lost, control one or more of the communication unit and the activity on the main radio channels to reduce the RF emissions to one or more of a silent RF emissions state and a low RF emissions state, the silent RF emissions state to reduce the RF emissions to zero, and the low RF emissions state to reduce the RF emissions to below a given RF emissions level.

5. A method comprising:
   receiving, at a device, via a communication unit communicating over a control channel, a radio-frequency (RF) emissions control command to reduce RF emissions emitted by the communication unit, the communication unit configured to communicate via main radio channels and the control channel, the main radio channels contributing to the RF emissions; and
   in response to receiving the RF emissions control command, controlling, at the device, one or more of the communication unit and activity on main radio channels to reduce the RF emissions,
   wherein the RF emissions control command comprises an indication of a given RF emissions state, and the method further comprises:
   controlling one or more of the communication unit and the activity on the main radio channels to reduce the RF emissions to between an emissions state lower than a current emissions state and the given RF emissions state.

6. The method of claim 5, wherein the given RF emissions state comprises a silent RF emissions state to reduce the RF emissions to zero.

7. The method of claim 5, wherein controlling one or more of the communication unit and the activity on the main radio channels to reduce the RF emissions occurs by one or more of:
   reducing a transmit power of the communication unit;
   reducing a data rate;
   reducing a modulation state;
   controlling a spreading factor;
   limiting transmissions to other devices associated with a class of users;
   refusing respective transmissions from the other devices associated with the class of users;
   altering one or more of: a sleep cycle, a silent periodicity cycle and a duty cycle;
   limiting transmit opportunities;
   refusing given classes of data traffic; and
   modifying an uplink scheduling algorithm.

8. The method of claim 5, further comprising:
   when communication with the control channel is lost, controlling one or more of the communication unit and the activity on the main radio channels to reduce the RF emissions to one or more of a silent RF emissions state and a low RF emissions state, the silent RF emissions state to reduce the RF emissions to zero, and the low RF emissions state to reduce the RF emissions to below a given RF emissions level.

9. A device comprising:
   a communication unit configured to communicate with one or more communication devices via at least a control channel, the one or more communication devices communicating via main radio channels; and a controller interconnected with the communication unit, the controller configured to:

determine that radio-frequency (RF) emissions are to be reduced at one or more of the communication devices; and transmit, via the communication unit communicating over the control channel, to one or more of the communication devices, an RF emissions control command to reduce the RF emissions emitted by the one or more of the communication devices, wherein the RF emissions control command comprises an indication of a given RF emissions state, and the RF emissions control command controls the one or more communication devices to control one or more of respective communication units and activity on the main radio channels to reduce the RF emissions to between an emissions state lower than a current emissions state and the given RF emissions state.

10. The device of claim 9, wherein the control channel comprises one or more of:

a channel of the main radio channels; and one or more side channels of the main radio channels.

11. The device of claim 9, wherein the controller is further configured to:

determine a subset of the one or more communication devices for which the RF emissions are to be reduced, wherein the RF emissions control command is to reduce the RF emissions emitted by the subset.

12. The device of claim 9, wherein the controller is further configured to:

refrain from transmitting communications to a subset of the one or more communication devices.

13. The device of claim 9, wherein the controller is further configured to:

determine that the radio-frequency RF emissions are to resume at the one or more of the communication devices; and transmit, via the communication unit communicating over the control channel, to one or more of the communication devices, a control command to resume the RF emissions.

14. A method comprising:

determining, at a device, that radio-frequency (RF) emissions are to be reduced at one or more communication devices, the device configured to communicate with the one or more communication devices via main radio channels and a control channel; and transmitting, by the device communicating over the control channel, to one or more of the communication devices, an RF emissions control command to reduce the RF emissions emitted by the one or more of the communication devices, wherein the RF emissions control command comprises an indication of a given RF emissions state, and the RF emissions control command controls the one or more communication devices to control one or more of respective communication units and activity on the main radio channels to reduce the RF emissions to between an emissions state lower than a current emissions state and the given RF emissions state.

15. The method of claim 14, further comprising:

determining a subset of the one or more communication devices for which the RF emissions are to be reduced, wherein the RF emissions control command is to reduce the RF emissions emitted by the subset.

16. The method of claim 14, further comprising:

refraining from transmitting communications to a subset of the one or more communication devices.

17. The method of claim 14, further comprising:

determining that the radio-frequency RF emissions are to resume at the one or more of the communication devices; and transmitting, over the control channel, to one or more of the communication devices, a control command to resume the RF emissions.

18. The device of claim 1, wherein the communication unit comprise a single communication unit, and the RF emissions control command indicates a set of RF emissions state data comprising one or more of settings and instructions for reducing the RF emissions on the main radio channels.

* * * * *